(12) United States Patent
Daffron

(10) Patent No.: US 8,024,548 B2
(45) Date of Patent: Sep. 20, 2011

(54) INTEGRATED CIRCUIT MICROPROCESSOR THAT CONSTRUCTS, AT RUN TIME, INTEGRATED RECONFIGURABLE LOGIC INTO PERSISTENT FINITE STATE MACHINES FROM PRE-COMPILED MACHINE CODE INSTRUCTION SEQUENCES

(76) Inventor: Christopher Joseph Daffron, Phoenix, AZ (US)

( * ) Notice: Subject to any disclaimer, the term of this patent is extended or adjusted under 35 U.S.C. 154(b) by 1903 days.

(21) Appl. No.: 10/248,785

(22) Filed: Feb. 18, 2003

(65) Prior Publication Data

US 2010/0268922 A1 Oct. 21, 2010

(51) Int. Cl.
*G06F 15/76* (2006.01)
*G06F 9/30* (2006.01)

(52) U.S. Cl. .................................................. 712/15

(58) Field of Classification Search .................. 712/20, 712/30, 36, 37
See application file for complete search history.

(56) References Cited

U.S. PATENT DOCUMENTS

| | | | | |
|---|---|---|---|---|
| 5,684,980 A | * | 11/1997 | Casselman | 703/23 |
| 5,748,979 A | * | 5/1998 | Trimberger | 712/37 |
| 5,794,062 A | * | 8/1998 | Baxter | 712/30 |
| 5,802,290 A | * | 9/1998 | Casselman | 709/201 |
| 6,023,755 A | * | 2/2000 | Casselman | 712/37 |
| 6,289,440 B1 | * | 9/2001 | Casselman | 712/227 |
| 7,114,062 B2 | | 9/2006 | Johnson | |
| 7,603,542 B2 | * | 10/2009 | Inuo | 712/220 |
| 2008/0028186 A1 | | 1/2008 | Casselman | |
| 2008/0028187 A1 | | 1/2008 | Casselman et al. | |

OTHER PUBLICATIONS

French, P.C and R.W. Taylor. A Self-reconfiguring processor. IEEE: 1993.*
Tanenbaum, "Structured Computer Organization", 2nd Edition, 1984, pp. 10-11.*
Hastie et al., "The Implementation of Hardware Subroutines on Field Programmable Gate Arrays", 1990, pp. 31.4.1-31.4.4.*
William I. Fletcher, An Engineering Approach to Digital Design, 1980, pp. 226, 231, 240, 241, Prentice-Hall, Englewood Cliffs, New Jersey, U.SA. ISBN 0-13-277699.5.
Tom Shanley, Pentium Pro and Pentium II System Architecture, Sep. 1999, pp. 279, 389 Addison-Wesley, Reading Massachusetts, USA. ISBN 0-201-30973-4.
Steven Casselman, Virtual Computing and the Virtual Computer, IEEE, Jul. 1993, 0-8186-3890-7/93.
Hans-Peter Messmer,The Indispensable PC Hardware Book,1998, pp. 1311-1362 (Glossary), Third Addition, Addison Wesley Longman, Essex, England, ISBN 0-201-40399-4.
M.B. Gokhale, A. Kopser, S.P. Lucas, R.G. Minnich, "The Logic Description Generator", IEEE, Jun. 1990, pp. 111-120, Proceedings of the Application Specific Array Processors ,Jul. 1990, DOI: 10.1109/ASAP.1990.145448. Originally filed by Applicant on May 11, 2006.
Tom Shanley, Pentium Pro and Pentium II System Architecture, Sep. 1999, pp. 13, 279, 393, 394, 387, Addison-Wesley, Reading Massachusetts, U.S.A., ISBN: 0-201-30973-4.

* cited by examiner

*Primary Examiner* — David J Huisman
(74) *Attorney, Agent, or Firm* — Snell & Wilmer L.L.P.

(57) ABSTRACT

A processor, integrated with re-configurable logic and memory elements, is disclosed which is to be used as part of a shared memory, multiprocessor computer system. The invention utilizes the re-configurable elements to construct persistent finite state machines based on information decoded by the invention from sequences of CISC or RISC type processor machine instructions residing in memory. The invention implements the same algorithm represented by the sequence of encoded instructions, but executes the algorithm consuming significantly fewer clock cycles than would be consumed by the processor originally targeted to execute the sequence of encoded instructions.

2 Claims, 1 Drawing Sheet

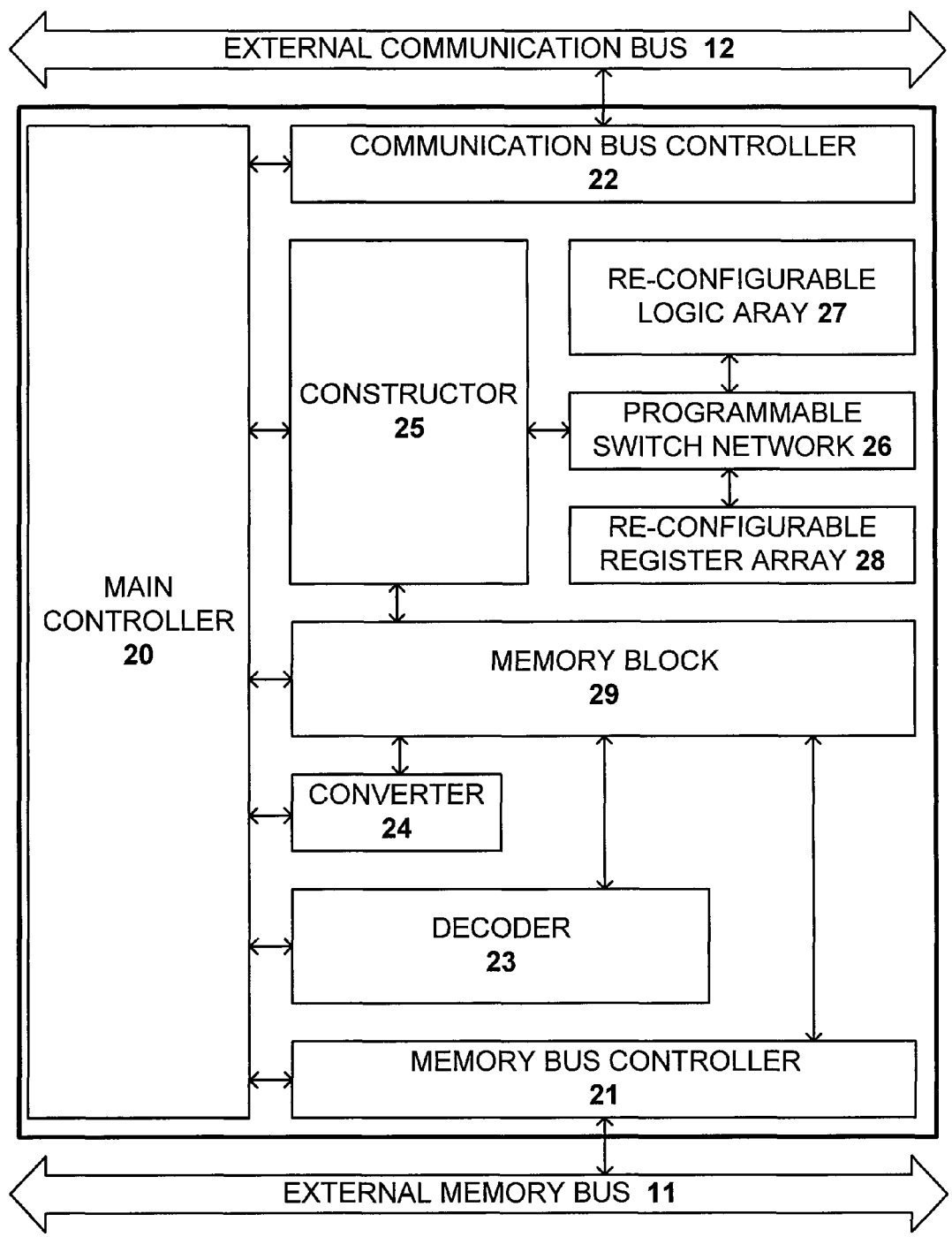

INTEGRATED CIRCUIT MICROPROCESSOR THAT CONSTRUCTS, AT RUN TIME, INTEGRATED RECONFIGURABLE LOGIC INTO PERSISTENT FINITE STATE MACHINES FROM PRE-COMPILED MACHINE CODE INSTRUCTION SEQUENCES

BACKGROUND OF INVENTION

A typical multiprocessing computer system consists of operating system software residing in main memory running on at least one of two or more microprocessors executing code in parallel that share both a common memory access bus as well as an inter-processor communication bus.

Two types of microprocessors are commonly used to implement a multiprocessing computer system: Complex Instruction Set Computer (CISC) processors or Reduced Instruction Set Computer (RISC) processors. Both types of processors operate by fetching native machine instructions from memory, decoding them, and then executing those instructions in sequential order. Each step in the process of completing an instruction consumes clock cycles. The same cumulative number of clock cycles will be consumed each time the same sequence of instructions is completed.

Virtually any computer algorithm can be implemented through the correct sequencing of instructions which are encoded in the native machine language of the particular CISC or RISC processor targeted to execute that sequence. This sequence of encoded instructions residing in memory is essentially a representation of the algorithm itself. Therefore, any type of processor having access to the block of memory containing the instruction sequence, and having the capability of decoding the sequence, can potentially implement the algorithm even though it may not have been the original processor targeted to execute the sequence.

Alternatively, a computer algorithm can be implemented by constructing a finite state machine through the correct configuration of one or more re-configurable logic devices. A well known example of a re-configurable logic device is a Field Programmable Gate Array (FPGA). A typical re-configurable logic device contains an array of both simple and complex logic elements, as well as, registers. The configuration information is stored in memory in the form of an encoded bit map. This bit map residing in memory essentially represents the finite state machine and therefore the algorithm itself.

A re-configurable logic device only has to fetch and decode the configuration bit map once to construct any finite state machine whose existence will persist until re-programmed. For a given algorithm, a finite state machine typically requires significantly fewer clock cycles to execute as compared to a microprocessor executing a sequence of instructions. The ability of a re-configurable logic device to implement computer algorithms depends on the variety, complexity and quantity of logic elements available to configure.

SUMMARY OF INVENTION

The present invention discloses a processor which constructs and executes persistent finite state machines using sequences of machine instructions, residing in shared memory, which represent computer algorithms originally targeted to be executed by either a CISC or RISC type microprocessor. The novel features characteristic of the present invention allow for the execution of computer algorithms consuming significantly fewer clock cycles than would be required by a CISC or RISC type processor sequentially executing those same computer algorithms encoded in their own native machine language.

BRIEF DESCRIPTION OF DRAWINGS

The novel features believed characteristic of the invention are set forth in the appended claims. The invention itself will be best understood by reference to the following description and accompanying drawing wherein:

The FIGURE is a functional block diagram of a processor in accordance with the preferred embodiment of the present invention.

DETAILED DESCRIPTION

The preferred embodiment of the present invention is best understood by referring to the FIGURE.

The FIGURE illustrates the basic functional block diagram of a processor in accordance with the preferred embodiment of the present invention. The processor is comprised of ten separate functional circuit blocks which operate together to enable the processor to construct persistent finite state machines capable of executing computer algorithms that were originally encoded as a sequence of machine instructions native to a CISC or RISC type microprocessor.

The components necessary to build finite state machines are contained within the re-configurable logic array 27, the re-configurable register array 28, and the programmable switch network 26. The re-configurable logic array 27 can contain a variety of individual logic elements ranging from simple combinational logic gates to more complex general logic functions such as adders or shift registers. The re-configurable register array 28 contains many memory storage elements, such as flip-flops, that can be configured to operate individually, or grouped together to work in either a serial or parallel fashion. The programmable switch network 26 is composed of a network of conductive and connective elements that have operational connections to every element contained within both the re-configurable logic array 27 and the re-configurable register array 28. This network terminates to an array of switching devices, also contained within the programmable switch network 26, which can be programmed to connect together elements within both the re-configurable logic array 27 and the re-configurable register array 28 into one or more of the available configuration combinations. Each configuration combination represents the intended behavior of an executable finite state machine whose existence will persist until the programmable switch network 26 is re-programmed.

The constructer 25 has the task of constructing executable finite state machines by programming the programmable switch network 26. The constructer 25 utilizes configuration bit maps, fetched from a memory cache contained within the memory block 29, to direct its finite state machine building tasks. A given configuration bit map represents the state of one or more switching devices that are contained within the programmable switch network 26. The constructer 25 is also responsible for relaying data between the finite state machines and the memory block 29.

The decoder 23 is specifically designed to decode sequences of machine instructions native to either a specific Complex Instruction Set Computer (CISC) microprocessor or a Reduced Instruction Set Computer (RISC) microprocessor. The decoder 23 requires knowledge of the encoded instruction set for a particular CISC or RISC type processor in order to correctly decode a sequence of machine instructions originally targeted to be executed by that processor. The decoder 23 fetches the sequence of machine instructions from a memory cache contained within the memory block 29. The decoder 23 has the ability to re-order a decoded instruction sequence, as well as, parsing it into smaller sequences that are readily translatable into finite state machines. The decoder 23 then stores the decoded and parsed sequences of instructions into a different memory cache also contained within the memory block 29.

The converter 24 has the task of converting the decoded and parsed sequences of instructions, fetched from a memory cache contained within the memory block 29, into configuration bit maps that the constructer 25 can use to construct finite state machines. The converter 24 then stores the configuration bit maps into a different memory cache also contained within the memory block 29.

The memory block 29 contains an array of both volatile and non-volatile types of memory devices organized into separate groups. Portions of the memory contained within the memory block 29 are in the form of caches, and are directly accessible by a majority of the processor's functional circuit blocks.

The memory bus controller 21 interfaces with an external memory bus 11 by which the processor accesses externally shared memory. The memory bus controller 21 is a bus mastering agent designed with both the operational connections, as well as, the necessary protocols compatible with a specific bus design enabling it to correctly carry out transactions on the external memory bus 11. Having access to the externally shared memory, the memory bus controller 21 can fetch sequences of machine instructions and store them into a memory cache contained within the memory block 29. The memory bus controller 21 is also used to relay other forms of data between the memory block 29 and externally shared memory such as data produced by any finite state machine.

The communication bus controller 22 interfaces with an external communication bus 12 by which the processor can communicate with the other external processors having access to the same external communication bus 12. The communication bus controller 22 is designed with both the operational connections, as well as, the necessary protocols compatible with a specific bus design enabling it to correctly carry out transactions on the external communication bus 12. An inter-processor communication bus is essential for any multiprocessing computer system. It is thru the use of the communication bus controller 22 that the processor determines which sequences of machine instructions to fetch from externally shared memory that are subsequently used by the processor to construct executable finite state machines.

The main controller 20 is responsible for the over all control and coordination of the activities of all other functional circuit blocks contained within the processor. The behavior of the main controller 20 can optionally be modified by configuration data it fetches from the memory block 29 which optionally could have been originally fetched from externally shared memory by the memory bus controller 21.

The invention claimed is:

1. An integrated circuit microprocessor that configures integrated finite state machines, that are dedicated to executing particular computer algorithms, by utilizing both integrated re-configurable logic and configuration bit map codes that are generated by the integrated circuit microprocessor itself by decoding, re-ordering, parsing, and then converting, at run time, pre-compiled or pre-assembled sequences of binary encoded Complex Instruction Set Computer (CISC) type or Reduced Instruction Set Computer (RISC) type machine code instructions into said configuration bit map codes that are used by the integrated circuit microprocessor to configure, at run time, said integrated re-configurable logic into said integrated finite state machines in order to execute said particular computer algorithms at a faster rate than the rate at which said conventional CISC type or RISC type microprocessor can execute the same said particular computer algorithms;

Wherein the pre-compiled or pre-assembled sequences are composed of members of a conventional CISC type or RISC type microprocessor's machine code instruction set;

Wherein the pre-compiled or pre-assembled sequences represent said particular computer algorithms; and Wherein the integrated circuit microprocessor comprises:

An integrated array of re-configurable gate logic hardware circuits;

An integrated array of re-configurable register logic hardware circuits;

An integrated programmable switch network having direct operational connections to every element contained within both the array of re-configurable gate logic hardware circuits and the array of re-configurable register logic hardware circuits;

An integrated memory hardware circuit block comprising a plurality of cache memory circuits and a plurality of non-volatile memory hardware circuits;

An integrated binary code decoder hardware circuit block that provides the means for performing, at run time, said decoding, re-ordering, and parsing of said sequences of binary encoded CISC type or RISC type machine code instructions, that represent said particular computer algorithms, into newly generated sequences of binary code which are then stored into a first cache memory of the integrated memory hardware circuit block;

An integrated binary code converter hardware circuit block that provides the means for converting, at run time, said newly generated sequences of binary code, that are generated by the integrated binary code decoder hardware circuit block, into newly generated configuration bit map codes which are then stored into a second cache memory of the integrated memory hardware circuit block;

An integrated constructer hardware circuit block that provides the means for configuring, at run time, the integrated arrays of re-configurable gate logic and re-configurable register logic hardware circuits into said integrated finite state machines through the use of said newly generated configuration bit map codes, that are generated by the integrated binary code converter hardware circuit block, and the direct controlling of the integrated programmable switch network;

An integrated memory bus controller hardware circuit block that provides the means for directly interfacing with an external memory bus compatible with a multiprocessor computer system, and operating said external memory bus in order to fetch said sequences of binary encoded CISC type or RISC type machine code instructions that are stored in externally shared memory, and then store said sequences of binary encoded CISC type or RISC type machine code instructions into a third cache memory of the integrated memory hardware circuit block;

An integrated inter-processor communication bus controller hardware circuit block that provides the means for directly interfacing with an external inter-processor communication bus compatible with a multiprocessor computer system, and operating said external inter-processor communication bus in order to communicate with other microprocessors that are also directly interfaced with said external inter-processor communication bus; and An integrated main controller hardware circuit block that provides the means for controlling and coordinating the activities of all said integrated hardware circuit blocks comprised within the integrated circuit microprocessor.

2. The integrated circuit microprocessor of claim 1 whereby the integrated circuit microprocessor is operated as part of a multiprocessor host computer system comprising:

At least two host microprocessors executing code in parallel wherein at least one host microprocessor is the integrated circuit microprocessor and at least one other host microprocessor is said conventional CISC type or RISC type microprocessor;

A host main memory integrated hardware circuit operationally connected to the at least two host microprocessors wherein the host main memory integrated hardware circuit is said shared memory;

A host memory bus having interconnection mechanisms for directly interfacing with the at least two host microprocessors and with the host main memory integrated hardware circuit whereby the at least two host microprocessors can directly access said shared memory;

A host inter-processor communication bus having interconnection mechanisms for directly interfacing with the at least two host microprocessors whereby the at least two host microprocessors can directly communicate with each other;

A host operating system software program that resides in the host main memory integrated hardware circuit and is executing on at least one of the at least two host microprocessors; and Computer algorithms which are represented by said sequences of binary encoded CISC type or RISC type machine code instructions and which are stored in said shared memory.

\* \* \* \* \*